US 12,205,250 B2

(12) United States Patent
Chee et al.

(10) Patent No.: US 12,205,250 B2
(45) Date of Patent: Jan. 21, 2025

(54) CLOUD BASED INTELLIGENT IMAGE ENHANCEMENT SYSTEM

(71) Applicant: Black Sesame Technologies Inc., San Jose, CA (US)

(72) Inventors: Evelyn Chee, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 412 days.

(21) Appl. No.: 17/574,327

(22) Filed: Jan. 12, 2022

(65) Prior Publication Data

US 2023/0222635 A1    Jul. 13, 2023

(51) Int. Cl.
*G06T 5/50* (2006.01)
*G06T 3/4038* (2024.01)
(Continued)

(52) U.S. Cl.
CPC .............. *G06T 5/50* (2013.01); *G06T 3/4038* (2013.01); *G06T 5/70* (2024.01); *G06T 5/73* (2024.01);
(Continued)

(58) Field of Classification Search
CPC ........... G06T 5/50; G06T 3/4038; G06T 5/70; G06T 5/73; G06T 5/77; G06T 7/33; G06T 2207/20221; G06T 5/60; G06T 2207/20084; G06T 5/92; G06T 7/90; G06T 11/40; G06T 11/001; G06T 19/00; G06T 2207/10024; G06T 2207/10028; G06T 2207/10016; G06T 2200/04; G06T 15/205; G06V 10/40; G06V 10/761; G06V 10/764; G06V 10/30; G06V 10/56; G06V 20/647; H04N 1/6005; H04N 13/257; H04N 13/275; H04N 13/282
See application file for complete search history.

(56) References Cited

U.S. PATENT DOCUMENTS 6,987,520 B2    1/2006 Criminisi et al.
7,755,645 B2    7/2010 Sun et al.
(Continued)

FOREIGN PATENT DOCUMENTS

| CN | 108921789 | 11/2018 |
|---|---|---|
| CN | 106683067 | 6/2020 |
| WO | WO-2021078001 A1 * | 4/2021 |

*Primary Examiner* — Jose L Couso
(74) *Attorney, Agent, or Firm* — Timothy T. Wang; Ni, Wang & Massand, PLLC

(57) ABSTRACT

The present invention discloses an intelligent cloud-based photo enhancement system to improve the quality and aesthetics of an image captured via an electronic device. The cloud-based photo enhancement system comprises a cloud database containing a collection of high-quality photos taken at various locations worldwide and under different environment settings. Information from photos stored in the cloud database taken using better photographic capability cameras is used to improve details that the new photo fails to capture. The system relies not only on machine learning models but also utilizes data associated with the new image collected from the hardware of the electronic device such as camera settings, GPS and phone sensors, which results in more reliable information.

16 Claims, 6 Drawing Sheets

(51) Int. Cl.
*G06T 5/70* (2024.01)
*G06T 5/73* (2024.01)
*G06T 5/77* (2024.01)
*G06T 7/33* (2017.01)
*G06V 10/40* (2022.01)
*G06V 10/74* (2022.01)

(52) U.S. Cl.
CPC .................. *G06T 5/77* (2024.01); *G06T 7/33* (2017.01); *G06V 10/40* (2022.01); *G06V 10/761* (2022.01); *G06T 2207/20221* (2013.01)

(56) References Cited

U.S. PATENT DOCUMENTS

| | | |
|---|---|---|
| 7,889,948 B2 | 2/2011 | Steedly et al. |
| 8,345,961 B2 | 1/2013 | Li et al. |
| 8,520,736 B2 | 8/2013 | Topiwala |
| 8,619,148 B1 * | 12/2013 | Watts ................ H04N 5/2621 |
| | | 348/222.1 |
| 8,750,647 B2 | 6/2014 | Jesneck et al. |
| 9,208,548 B1 * | 12/2015 | Noble ................ G06F 16/5866 |
| 10,699,453 B2 * | 6/2020 | Jin ............................ G06T 5/50 |
| 2007/0237421 A1 | 10/2007 | Luo et al. |
| 2008/0181534 A1 * | 7/2008 | Toyoda ................ H04N 1/3876 |
| | | 382/284 |
| 2009/0245603 A1 * | 10/2009 | Koruga .................. A61B 5/444 |
| | | 382/128 |
| 2012/0268612 A1 * | 10/2012 | Wang .................... G06F 18/211 |
| | | 348/207.1 |
| 2013/0177242 A1 | 7/2013 | Adams, Jr. et al. |
| 2013/0188866 A1 * | 7/2013 | Obrador ................ G06V 20/10 |
| | | 382/165 |
| 2014/0002439 A1 * | 1/2014 | Lynch .................. G01C 21/367 |
| | | 345/419 |
| 2015/0070523 A1 * | 3/2015 | Chao .................... H04N 23/951 |
| | | 348/218.1 |
| 2015/0117786 A1 * | 4/2015 | James ...................... G06T 7/11 |
| | | 382/195 |
| 2015/0363922 A1 | 12/2015 | Elliott et al. |
| 2017/0041543 A1 * | 2/2017 | Kikuchi .............. H04N 23/6842 |
| 2017/0064203 A1 * | 3/2017 | Kikuta .............. H04N 5/2624 |
| 2018/0075581 A1 | 3/2018 | Shi et al. |
| 2018/0165798 A1 * | 6/2018 | Lin ............................ G06T 5/77 |
| 2018/0336666 A1 * | 11/2018 | Kim ........................ G06T 7/70 |
| 2019/0199929 A1 * | 6/2019 | Sekine ...................... G06T 5/73 |
| 2021/0056668 A1 * | 2/2021 | Barnes ...................... G06T 5/77 |
| 2022/0301192 A1 * | 9/2022 | Boardman .............. G06T 7/579 |
| 2023/0179871 A1 * | 6/2023 | Kwong ...................... G06T 5/92 |
| | | 348/229.1 |

* cited by examiner

CLOUD BASED INTELLIGENT IMAGE ENHANCEMENT SYSTEM

FIELD OF INVENTION

The present invention relates to a system and a method for providing a high quality image. More specifically, the present invention relates to improving the aesthetics of an image by using a cloud database consisting of high quality images.

BACKGROUND OF THE INVENTION

Traditionally, much work has been done on applying processing operations on images to enhance their quality or aesthetics. A commonly used enhancement is super resolution, which is the process of up-scaling and improving the details of an image. There are many existing proposed methods in this field including traditional or deep learning approaches. Regardless of whether the methods are based on single or multi-frame inputs, the amount of information that could be enhanced is restricted by the number of details available within the input frames.

There are deep learning models using GANs which claims to introduce additional details, but they face the risk of being unrealistic and unnatural artefacts. Another deep learning approach proposed is an exemplar-based super resolution, more closely related to our proposed system, which includes transferring relevant textures from high resolution reference images to a query image.

Currently, enhancements in the image processing applications include object removal by inpainting, which refers to filling in missing parts of the photo. Some common techniques to perform inpainting include both traditional and deep learning methods. For traditional approaches, pixel information from other image parts which are not missing is used and thus, its performance could be unstable, especially when the details within the gap are non-repetitive in structure whereas for deep learning, like super resolution, the main drawback is the risk of introducing unrealistic details.

Besides improvement and addition of details within a photo, another way to increase the aesthetic value of a photo is to improve the photo composition. A commonly used operation is cropping such that extraneous contents are removed, and the aspect ratio is modified, which results in improved compositions.

To determine the regions to crop, different approaches have been used: attention-driven methods, aesthetic-driven methods and data-driven methods. By only relying on cropping, it is insufficient to change the relative proportion and position of the elements in the photo. Hence, there are also papers which propose to automatically retarget the image and move these elements towards their corresponding optimal position. One main shortcoming of using these post-processing approaches is that the amount of information to work on is restricted to only what is available within the photo.

Lastly, another useful application is panoramic photography, a technique which captures images with larger field of view than what a camera is able. Due to the wider field of view, the resulting photo is more like what the human eye is accustomed to seeing and thus, has better aesthetic value. The most common method for producing such images is to take a series of photos at different angles from a stationary position and stitch them together.

However, the results still depend on the quality of the series of photos. In other words, these techniques can only work with whatever input given. If the quality of some of the input images is bad, such as inconsistent brightness or insufficient overlapping regions between images, the results would be unsatisfying. Also, the final field of view is restricted to angle covered when taking these photos and thus, there is no way except to retake the photos if the user prefers even wider view.

Many prior arts focus on improving the image quality through better photo composition. A research paper titled *Optimizing Photo Composition* by Ligang Liu discloses methods for optimizing the aesthetics of an image. An aesthetic score is assigned to an image based on an analysis of its spatial structure and the distributions of salient regions and prominent lines in the image. Further, a cropping technique is employed to change the relative position of salient regions in the image and to modify the composition aesthetics of the image. The drawback associated with the methodology disclosed is that only pixel information within the image is used and thus, no additional details would be introduced into the enhanced image.

US Patent Application 20150363922 assigned to Samsung Electronics Co Ltd. relates to an apparatus and method for providing an image having increased resolution. The invention includes capturing of a plurality of frames of an image and a control unit configured to determine a reference frame from among the plurality of frames, to iteratively determine an offset of each of the plurality of frames to the reference frame until unity scaling is reached, and to determine a pixel value for insertion between pixels of the reference frame. Although the prior art provides a high-resolution image, it relies only on conventional methods of image transformation without incorporating the use of a cloud database for comparing the clicked image with several high-quality images and utilizing hardware data associated with the clicked image such as time, temperature and location information. This limits the amount of enhancement in the final image.

Another U.S. Pat. No. 7,889,948 assigned to Microsoft Technology Licensing, LLC and US application 20070237421 assigned to Monument Peak Ventures LLC relates to method for replacing a face in a first digital image with another image. The invention provides rendered images are evaluated to identify optimum seams along which the various images are to be blended. The result is a mosaic image constructed by warping the input images replacing the target area with the corrected source area and blending the corrected source area into the digital image.

Another US Application 20180075581 assigned to Twitter Inc. relates to machine learning techniques to process visual data using a plurality of datasets. A method disclosed in the prior art for training an algorithm to process at least a section of received low resolution visual data to estimate a high-resolution version of the low-resolution visual data using a training dataset and a reference dataset. Although, the invention overcomes the shortcomings of the above-mentioned prior arts by introducing a reference dataset, it only focuses on increasing the resolution of the image, thereby lacking in a lot of other aspects. Moreover, the reference dataset is only a small set comprising a limited number of images and may not provide the enhanced quality as per the user demand.

Hence, there is a need for an intelligent cloud-based photo enhancement system that improves the quality and aesthetics of a new image by utilizing several images stored in a cloud database. The intelligent cloud-based photo enhancement system not only relies on traditional machine learning techniques but also utilizes the hardware data associated with the electronic device used to capture the image.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, a continuing need exists for an intelligent cloud-based image enhancement system that improves the quality and aesthetics of an image using both software and hardware tools.

SUMMARY OF THE INVENTION

With the advancement of hardware technology and artificial intelligence in the mobile industry, the requirement level of quality and aesthetics of photos is continuously increasing. Both hardware and software tools have their pros and cons. Thus, an intelligent cloud-based photo enhancement system integrated with the advantages of both hardware and software tools, is disclosed in the present invention. The proposed framework offers automatic photo enhancements to overcome the low quality of the images obtained limited by the state of hardware through the use of a database containing high-quality images.

The primary objective of the present invention is to provide a cloud database that contains a collection of high-quality photos taken at various locations worldwide and under different environment settings, using diverse kind of camera models. The other components of the system include a feature extraction module, a recommender model and an image enhancement model. All of the above-mentioned components of the system work together to enhance the quality of a query image captured via an electronic device.

This whole workflow would be triggered when the camera app of an electronic device is opened, and the user positions the camera to capture a photo. Information, such as location, temperature and time, at instance of clicking the image is collected through the hardware installed in the camera and sent to the cloud database along with the image captured. Together with the photo, the image information data would be sent to the cloud database to search for images of similar content.

Several processes run concurrently during the search. Feature extraction models, such as place classification, location projection and environment condition classification, would be used to extract features from the image and its corresponding information to be compared with those in the database for similarity measurement. After the photo is taken, the enhancement process will be activated. Depending on the purpose of enhancement, the photo taken is then passed to the corresponding model to improve its quality with reference to the similar looking photos retrieved from the database. The resulting enhanced photo is then sent back to the user.

In the proposed system, photos stored in a cloud database are taken using better photographic capability cameras to extract details that a newly clicked photo fails to capture. On the other hand, users sometimes want to remove unwanted objects from a photo. But after the object removal, additional information is required to fill in the missing parts. The present invention could utilize data from the cloud database for such information.

Another possible limit that could be solved through the system is restrictions caused by the surrounding environment. For instance, the aesthetic value of a photo could be higher when taken at a certain angle but might be impossible to realize because the photographer would need to stand in water. This could be made possible using the proposed system as 3D reconstruction of the new image could be implemented using collections of images taken at different but nearby locations. The photo taken could then be projected at an angle that the user desires.

Besides that, there is a limit how wide of a scene a camera could capture. By using existing mature photo stitching technology and abundance of photos of similar scene taken at different angles, the cloud-based image enhancement system would automatically create a panorama through just one current photo.

Another objective of the present invention is that unlike image enhancement through pure use of machine learning models, which only have information from the captured image to work on, the system utilizes multiple photos from the database to add on actual details of the scene and further enhance the image. When extracting information to decide on similar images to retrieve from the database, the system does not only rely on machine learning models to interpret the information from images. In addition, it makes use of data collected from hardware such as camera settings, GPS and phone sensors, which results in more reliable information.

Yet another objective of the present invention is that the proposed system directly outputs the enhanced image and thus, requires minimal photography experience from users.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE DRAWINGS

Cameras have had a long history, as devices for recording visual data. Owing to the advancements in technology, electronic devices such as smart phones, tablets and digital cameras available nowadays can capture super resolution images and videos. The auto-focus function, the image-quality-correction function, etc. are some of the options that are present at the disposal of users to improve the quality of the images captured.

Due to the recent proliferation of camera-equipped mobile devices (e.g., smartphone, tablet, smart glasses, etc.) individuals are generating large volumes of images during their daily lives. The requirement level of quality and aesthetics of images captured is continuously increasing with the advancement of hardware and software technology in the field of image processing. An intelligent cloud-based image enhancement system is disclosed in the present invention that produces a high-quality image with the help of both hardware and artificial intelligence tools in the image processing industry.

Figure 1:
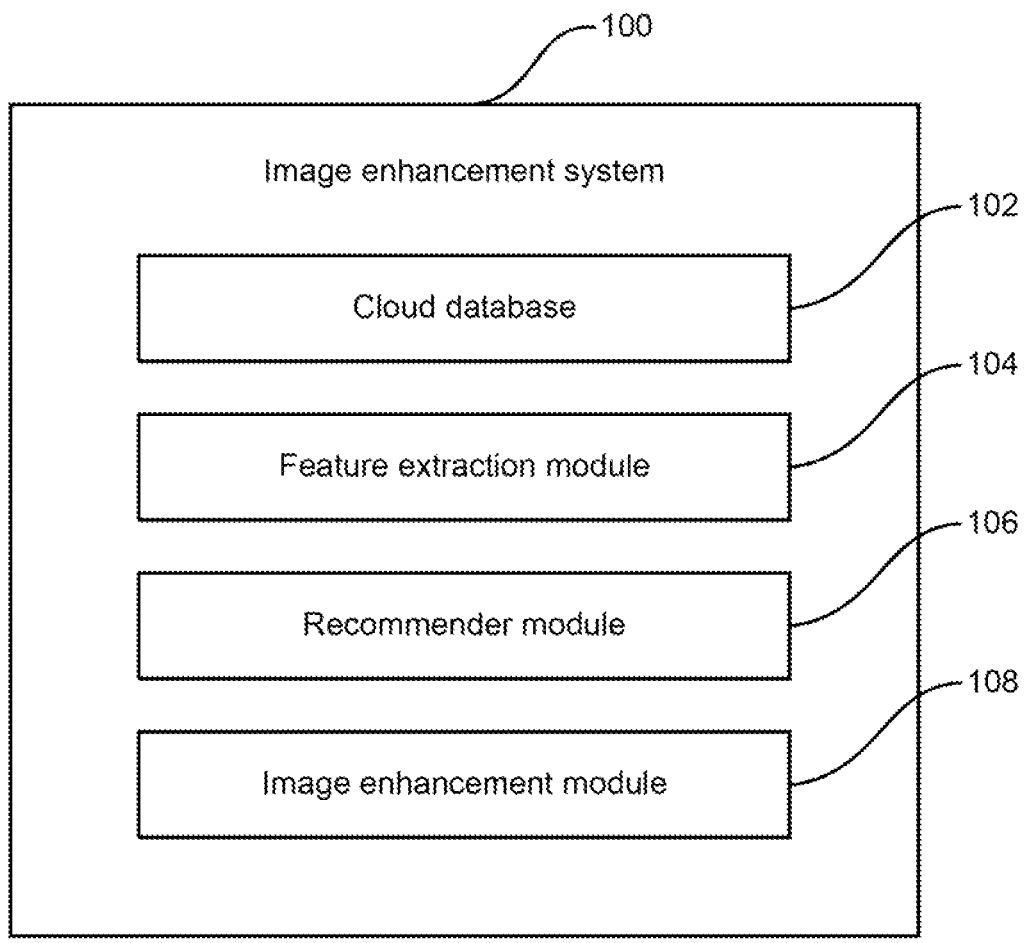
FIG. 1 illustrates an image enhancement system in accordance with the present invention.

FIG. 1 illustrates an intelligent cloud-based image enhancement system. The major element of the proposed intelligent cloud-based image enhancement system 100 is the cloud database 102, containing a collection of photos taken at various locations worldwide and under different environment settings, using diverse kind of camera model. For the initial set up of the database 102, the photos could be obtained from some online sources. To ensure the quality of the photos, they need to undergo a data cleaning process conducted either by photography experts or through existing image quality and aesthetic assessment methods. In other words, each photo is rated based on its quality and aesthetic value.

Those which score below a pre-determined threshold are removed from the database 102. For photos collected through social media, such as Facebook and Instagram, another direct approach to determine if one is of high aesthetic value is based on the number of likes it received. If available, the EXIF data of the corresponding photo is also stored. It provides information regarding the date, time, location, and so on when the photo was taken.

Another approach is to make use of the cloud storage which is installed in most smart phones. In other words, photos taken using these devices would have been automatically synced to the storage and with the user's permission, could be utilized as part of the database 102. Similarly, they are also required to undergo the data selection process. The EXIF data for these photos would most likely be available.

Once the system is live, photos taken using this platform can also be collected continuously. In other words, each time a photo is sent to the system for enhancement, it could also be stored as part of the database 102 if it satisfies the quality and aesthetic conditions. Similarly, existing image quality and aesthetic assessment methods could be used to automatically assess the quality or aesthetic quality of a photo.

One last practical consideration of the database 102 is regarding its storage size. Many photos are required to perfectly reconstruct a 3D space, which then requires an impractical storage size if all photos of original quality is kept in the database 102. Thus, amount of detail stored for each photo is compressed. One approach is to adopt the idea of visual feature coding strategy. The feasibility of this idea assumes that the features in photos of a local region are similar and can be shared across these images. Hence, a bag of features of each region and for each photo within the region could be stored. This reduces the storage space required for each photo and improves scalability.

Further, the intelligent cloud-based image enhancement system 100 comprises a feature extraction module 104 that comprises some feature extraction models. Simple perceptual metrics such as mean squared error, peak signal-to-noise ratio or structural similarity index are not suitable for the invention similarity between two identical images is not being measured herein. Instead, the system proposes to map the images to features where the distance between the features directly corresponds to the image similarity. In the primary embodiment, the extraction model within the feature extraction module 104 is the location projection model.

Location information is one of the features extracted from the captured image. It is useful, especially when photos of tourist attractions are involved, as the recommender model (described later) would be able to narrow down significantly to photos with scenes that are geographically close. Hence, the purpose of location projection model is to obtain features regarding the geographical location of where a photo was taken. The simplest way would be to extract the latitude and longitude coordinates from the GPS information from the camera and embed them into the feature. However, there are some other important factors to consider such as altitude in considering the similarity of images as there is still a notable difference in taking a photo of the same subject from a high view versus a bottom view.

In alternative embodiments, other feature extraction models may also be utilized. The other feature extraction models may include an object detection model which pinpoints and classifies objects of interest appearing in an image. This feature is important as it provides information about the context of the photo. It also helps understand what the focus of the photo is which is a key factor in ensuring good photo composition.

Another important factor to consider would be the condition in which the photo is taken. The aim of the environmental condition model is to extract information regarding the surrounding environment conditions as per displayed in the photo. Some factors of concerned are light and weather. This is because images of the same scene but taken different environment conditions might not be suitable to be integrated together. Hence, depending on the use-case, it would be important to use photos taken under similar conditions as reference to the input photo.

Additional sensors would also be installed on the camera to provide data such as temperature, haze and humidity. Combining the information collected from the hardware, the model would be able to better identify the environment condition that the user is currently experiencing.

A recommender module 106 is trained such that for each new query received, the closest images would be returned from the database 102 based on the features of the image extracted by the feature extraction module 104 explained above. Factors which account for the similarity between images include, but not limited to, geographical location where the photo is taken, surrounding conditions and objects detected in the image. The goal of the recommender module 106 is to recommend several similar images as reference to improve the quality and aesthetic value of a new photo.

Only images with a similarity score exceeding certain thresholds would be considered to ensure the quality of the resulting enhanced photo. Even if no single image of the same content exists the database 102, the quality of the original photo will at least remain and not deteriorate due to a wrongly suggested image. Another point to consider is that the weight on each feature when determining the similarity between images could differ depending on the use-case.

Utilizing the information from images obtained in the previous step, a photo enhancement module 108 is introduced to add value to the photo taken. Instead of using super resolution, de-blurring or de-noising models are utilized wherein, photos with the same content but taken at a better resolution and quality to enhance details of a given photo could be utilized. For instance, at each tourist attraction, many photos are taken using various types of cameras. The database 102 would contain high quality photos (e.g., taken using DSLR cameras) of these locations. When a new photo of the same scene is taken using a smart phone camera with lower photographic capability, the model could then use the high frequency details in the former photos to enhance the same objects within the latter.

The photos are first aligned and then merged. An example method for merging details of different frequency (i.e., low frequency from current photo and high frequency from high quality database 102 photos) is to use Laplacian pyramid blending. Unlike existing super resolution and deblurring deep learning models, these additional details would be realistic. The similarity measurement should weigh the location information and objects detected more as it requires only the high frequency information. Features such as time and temperature are not as influential since they mainly affect low frequency information of an image.

Within a photo, there sometimes exist unwanted objects that one would like to remove due to aesthetic reasons. One common use-case is portraits taken at tourist attraction in which one would like to remove the crowds from the background. However, after objects removal from image, gaps created need to be filled in with visually plausible background. Thus, through the collection of aligned photos of the same scene, the actual information missing could be found from the background and use it to replace the gap.

Unlike existing models where only information from the non-destroyed image areas is used, the method disclosed in the invention makes use of additional real details of those regions from other images and hence, leads to a more seamless reconstruction. As for the similarity measurement in this use-case, the role of the environment condition feature is as important as location information because reference images should be of similar context. It would be unreasonable to have a mixture of day and night or summer and winter within the same image.

One factor affecting the aesthetic value of a photo would be the composition of the photo. There are ways to arrange various elements in a scene within the frame such that they result with more attractive photos. However, users might not know the best shooting angle. Moreover, due to restrictions in the surrounding, there might be certain angles that are unattainable. Here, the collection of images is utilized which might be taken at different but nearby locations and could build a 3D virtual space of that region.

Simply speaking, these images share some common objects of interest but were viewed from different perspectives. From this set of images, 3D virtual space is constructed. The best viewing angle and distance sis found such that the objects of interest within the image remain but re-projected to improve the photo composition. Sometimes, camera lens, especially for smart phones, might not be wide enough the capture the whole scene. Users need not take multiple shots of the scene at different angles the database would consist of multiple photos that provide a better viewing angle for the image.

Figure 2:
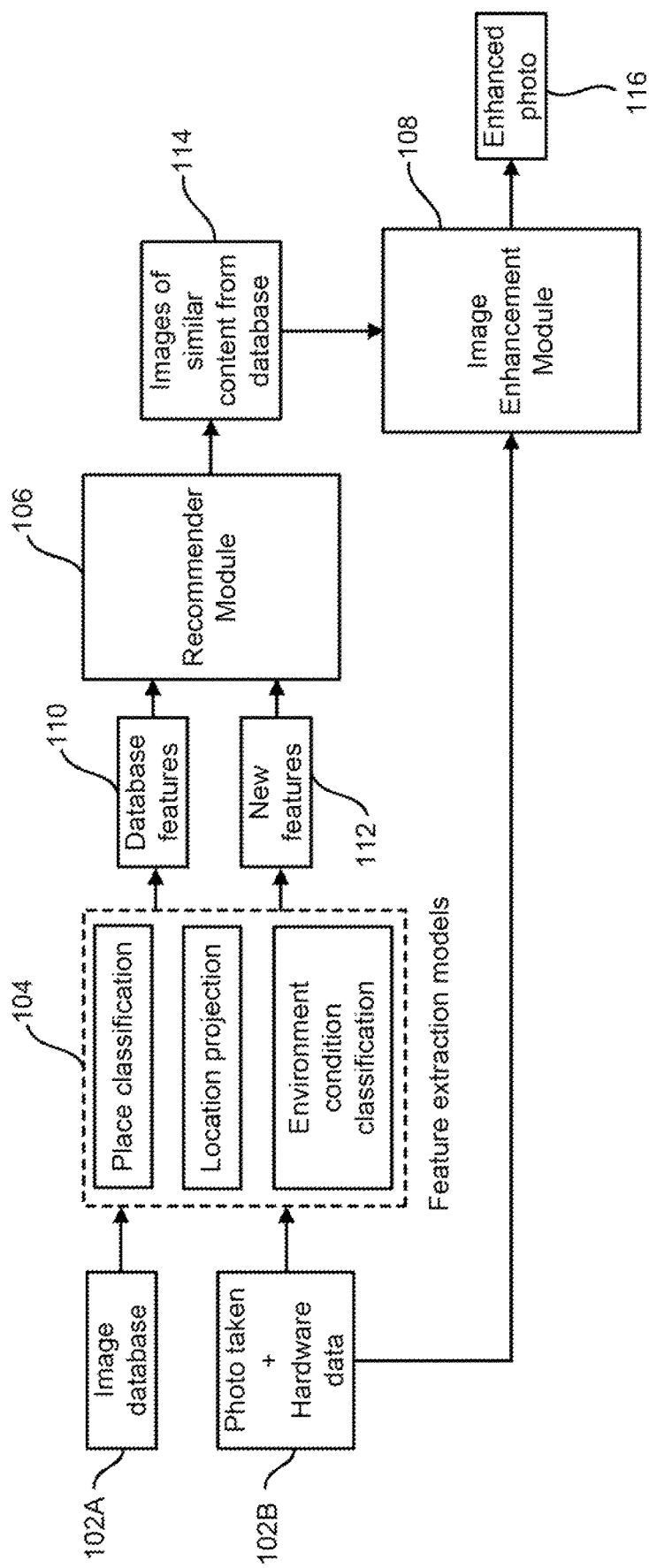
FIG. 2 illustrates architecture of the image enhancement system in accordance with the present invention.

FIG. 2 illustrates architecture of the image enhancement system. This whole workflow would be triggered when the camera app is opened, and the user positions the camera of an electronic device for taking a photo. The electronic device could be either of a smart phone, tablet, a digital camera or any other device with a camera installed in it. In the primary embodiment, the device used is a smart phone. The photo taken along with hardware information of the electronic device 102b is collected by the image database 102a.

The database 102a contains a collection of photos taken at various locations worldwide and under different environment settings, using diverse kind of camera models. For the initial set up of the database 102a, the photos could be obtained from some online sources. The database could also pick up photos from social networking sites or cloud storage of various electronic devices. The hardware information 102b includes information such as location, temperature and time, at that instance. The hardware includes multiple sensors configured within the electronic device. Some of the examples of the sensors include a GPS, an environmental sensor, a compass sensor, a barometer sensor and a light sensor.

Multiple machine learning models and feature extraction models configured within a feature extraction module 104 are known to extract features from the captured image. These feature extraction models would make use of the information extracted from the hardware of the electronic device used to capture the image. Feature extraction models, such as place classification, location projection and environment condition classification, would be used to extract features from the image and its corresponding information.

Location information is useful, especially when photos of tourist attractions are involved, as the recommender model (described later) would be able to narrow down significantly to photos with scenes that are geographically close. Hence, the purpose of this model is to obtain features regarding the geographical location of where a photo was taken.

Another model i.e., the object detection model detects and classifies objects of interest appearing in an image. This feature is important as it provides information about the context of the photo. It also helps understand what the focus of the photo is which is a key factor in ensuring good photo composition.

Another important factor to consider would be the condition in which the photo is taken. The aim of the environmental condition model is to extract information regarding the surrounding environment conditions as per displayed in the photo. Some factors of concerned are light and weather. This is because images of the same scene but taken different environment conditions might not be suitable to be integrated together.

The feature extraction model then compares the features extracted with the features of the collection of images stored in the database 102a. Based on comparisons, the feature extraction model groups the collection of images e.g., the photos may be grouped based on the location where they were captured.

These images of the same location could be used to construct a virtual 3D space. For each new incoming photo, matching points are found by comparing its detected key points and descriptors with those from other images. Hence, to avoid repeating computation, computed key points and descriptors information could also be stored together with new database 102a image.

Similarly, for the 3D space, reconstructing the 3D space may is not required every time there is a new photo. Instead, the corresponding position of the new photo could be determined within the previously constructed 3D space. In this way, the search process could be sped up in finding other relevant photos in the database 102a. Thus, not only the features 110 extracted by machine learning models running within the database are collected, but new features 112 corresponding to the hardware of the electronic device are also collected.

The recommender module 106 is trained such that for each new query received, the closest images would be returned from the database 102a. Factors which account for the similarity between images include, but not limited to, geographical location where the photo is taken, surrounding conditions and objects detected in the image. The goal of the recommender module 106 is to recommend several similar images 114 as reference to improve the quality and aesthetic value of a new photo. Images with a similarity score exceeding certain thresholds would be considered to ensure the quality of the resulting enhanced photo.

The image enhancement model 108 receives some images that are recommended by the recommender module. These images 114 are similar to the image captured in terms of the features extracted earlier. After receiving the recommended pictures 114, the enhancement process is activated. Depending on the purpose of enhancement, the photo taken is then passed to the corresponding model to improve its quality with reference to the similar looking photos retrieved from the database 102a. The enhancement could include one or more of de-blurring or de-noising of the image, perspective transformation of the image, finding a better viewing angle of the image or removing unwanted objects from the image. The resulting enhanced photo 116 is then sent back to the user.

Figure 3:
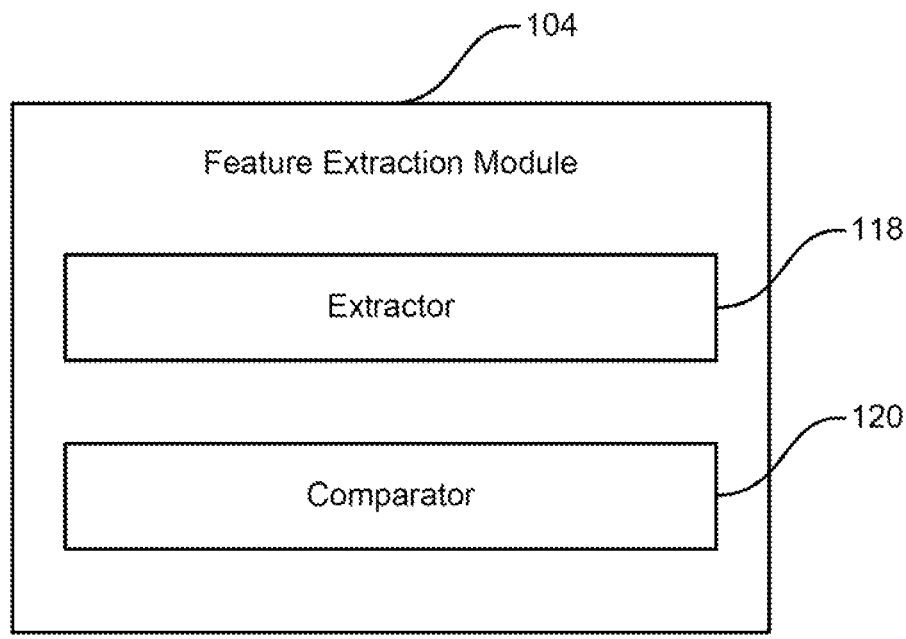
FIG. 3 illustrates a feature extraction module of the image enhancement system in accordance with the present invention.

FIG. 3 illustrates a feature extraction module of the image enhancement system. The feature extraction module 104 of the present invention consists of two components namely, an extractor 118 and a comparator 120. Several processes are executed concurrently behind the search process to extract features from the query image. Without good reference photos, the resulting enhanced image provided by the system could be of low quality regardless of the performance of the enhancement model.

Simple perceptual metrics such as mean squared error, peak signal-to-noise ratio or structural similarity index are not suitable for the system as the similarity between two identical images is not being measured herein. Instead, the images are mapped to features where the distance between the features directly correspond to the image similarity. Some example useful feature extraction models are as location projection, object detection and environment condition classification.

It is the role of the extractor 118 to extract several features from the image captured. These features are captured with the help of the hardware associated with the electronic device that has been used to capture the image. The electronic device could be a tablet, a smart phone or a digital camera. The hardware associated with the electronic device includes multiple sensors that store image information. Examples of sensors include a light sensor, an environmental sensor, a barometer sensor and a compass sensor.

Location information, one of the features extracted by the extractor 118 is useful, especially when photos of tourist attractions are involved, as the recommender module would be able to narrow down significantly to photos with scenes that are geographically close. Hence, the purpose of this module is to obtain features regarding the geographical location of where a photo was taken. The simplest way would be to extract the latitude and longitude coordinates from the GPS information from the camera and embed them into the feature.

Under the object classification model, the goal is to pinpoint and classify objects of interest appearing in an image. This feature is important as it provides us information about the context of the photo. It also helps understand what the focus of the photo is, a key factor in ensuring good photo composition. In short, it is essential for the recommender module to take this information into account and find photos with similar context and focus.

Another important factor to consider would be the condition in which the photo is taken. The aim of this module 104 is to extract information regarding the surrounding environment conditions as per displayed in the photo. Some factors of concerned are light and weather. This is because images of the same scene but taken different environment conditions might not be suitable to be integrated together.

Hence, depending on the use-case, it would be important to use photos taken under similar conditions as reference to the input photo. The information is used by the comparator of the feature extraction module for comparing the features of the captured image with the features of the images stored in the database.

Figure 4:
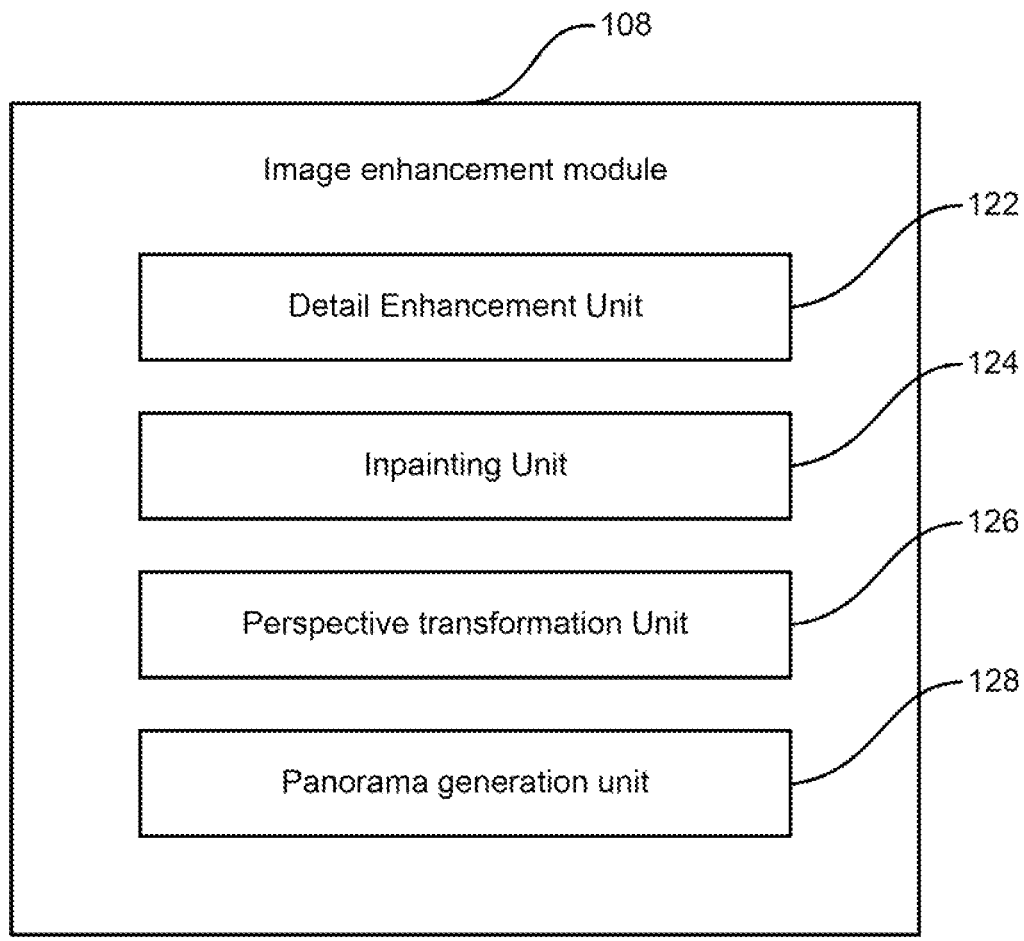
FIG. 4 illustrates an image enhancement module of the image enhancement system in accordance with the present invention.

FIG. 4 illustrates an image enhancement module of the image enhancement system. Utilizing the information from images obtained from the recommender module of the system, the image enhancement module 108 adds value to the photo taken. Some of the roles of the image enhancement module 108 include detail enhancement, inpainting, perspective transformation and wide-angle view which are performed by dedicated units configured within the image enhancement module 108.

The detail enhancement unit 122 is responsible for de-blurring and de-noising of the image captured. Photos with the same content but taken at a better resolution and quality to enhance details of a given photo could be utilized. For instance, at each tourist attraction, many photos are taken using various types of cameras. The database would contain high quality photos (e.g., taken using DSLR cameras) of these locations. When a new photo of the same scene is taken using a smart phone camera with lower photographic capability, the model 104 could then use the high frequency details in the former photos to enhance the same objects within the latter.

The photos are first aligned and then merged by the detail enhancement unit 122. An example method for merging details of different frequency (i.e., low frequency from current photo and high frequency from high quality database photos) is to use Laplacian pyramid blending. Unlike existing super resolution and de-blurring deep learning models, these additional details would be realistic. The similarity measurement should weigh the location information and objects detected more as it requires only the high frequency information. Features such as time and temperature are not as influential since they mainly affect low frequency information of an image.

Within a photo, there sometimes exist unwanted objects that one would want to remove due to aesthetic reasons. One common use-case is portraits taken at tourist attraction in which one would like to remove the crowds from the background. However, after object removal from image, there is a need to fill in those regions with visually plausible background. The inpainting unit 124 is responsible for performing the function of removing unwanted objects and filling in the gaps. Thus, through the collection of aligned photos of the same scene, the actual information missing from the background could be used to replace the gap.

Unlike existing models where only information from the non-destroyed image areas is used, the method disclosed in the invention makes use of additional real details of those regions from other images and hence, leads to a more seamless reconstruction. As for the similarity measurement in this use-case, the role of the environment condition feature is as important as location information because reference images should be of similar context. It would be unreasonable to have a mixture of day and night or summer and winter within the same image.

One factor affecting the aesthetic value of a photo would be the composition of the photo. There are ways to arrange various elements in a scene within the frame such that they result with more attractive photos. However, users might not know the best shooting angle. Moreover, due to restrictions in the surrounding, there might be certain angles that are unattainable. The perspective transformation unit 126 utilizes the collection of images which might be taken at different but nearby locations and could build a 3D virtual space of that region.

Sometimes, camera lens, especially for smart phones, might not be wide enough the capture the whole scene. Again, the 3D space reconstructed is made use of using the database of images. The 3D image is projected into 2D such that the original scene captured by the user is the centre of focus with additional side view cropped from the projection. This functionality is performed by the panorama generation unit 128. In other words, users need not take multiple shots of the scene at different angles this information could be compensated using above-mentioned reconstructed image. Users are no longer restricted only to the view captured within the series of photo and have the flexibility to choose how much field of view to include as the images from the database would have a wide coverage of that scene.

Figure 5:
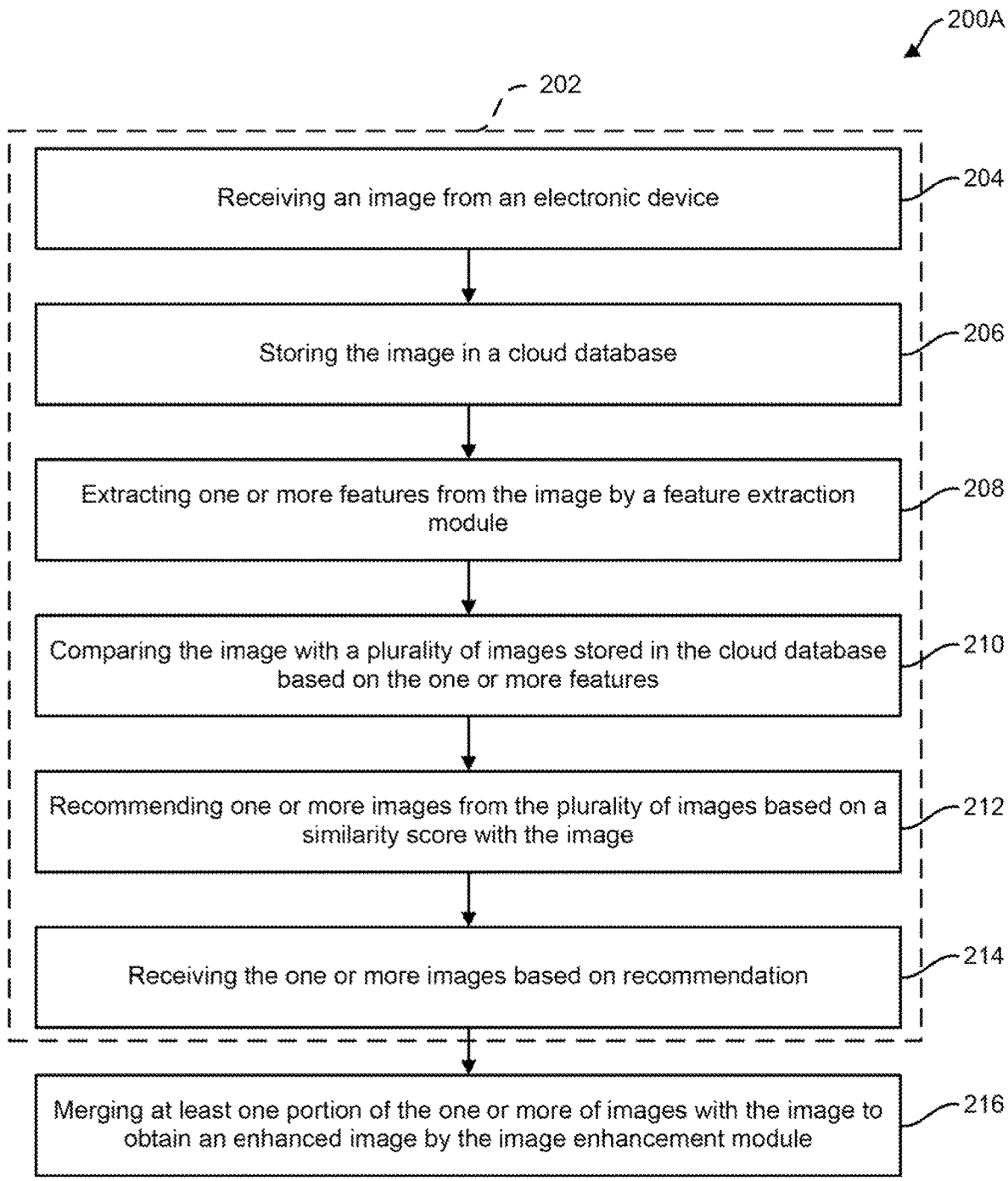
FIG. 5 illustrates a method for generating a cloud based enhanced image in accordance with present invention.

FIG. 5 illustrates a method for generating a cloud-based enhanced image. The flowchart 200a illustrates a method that includes firstly, receiving an image from an electronic device 204. The image along with some information related to the image captured by the hardware of the electronic device is sent to a cloud database and stored in the database in step 206. The database already stores several images that are obtained from several sources. Once the image is stored in the database, several features are extracted from the image by a feature extraction module. Feature extraction models such as place classification and object detection perform the feature extraction with the help of an extractor configured within the feature extraction module in step 208.

Next, the features extracted are compared with the features of the number images stored in the cloud database which is done by a comparator configured inside the feature extraction module 210. Based on the comparisons generated by the comparator, the recommender module recommends one or more images based on a similarity score 212. The recommended images are sent to the image enhancement module 214. Finally, at least one portion of the one or more images recommended is merged with the image to obtain an enhanced image by the image enhancement module in step 216.

Figure 6:
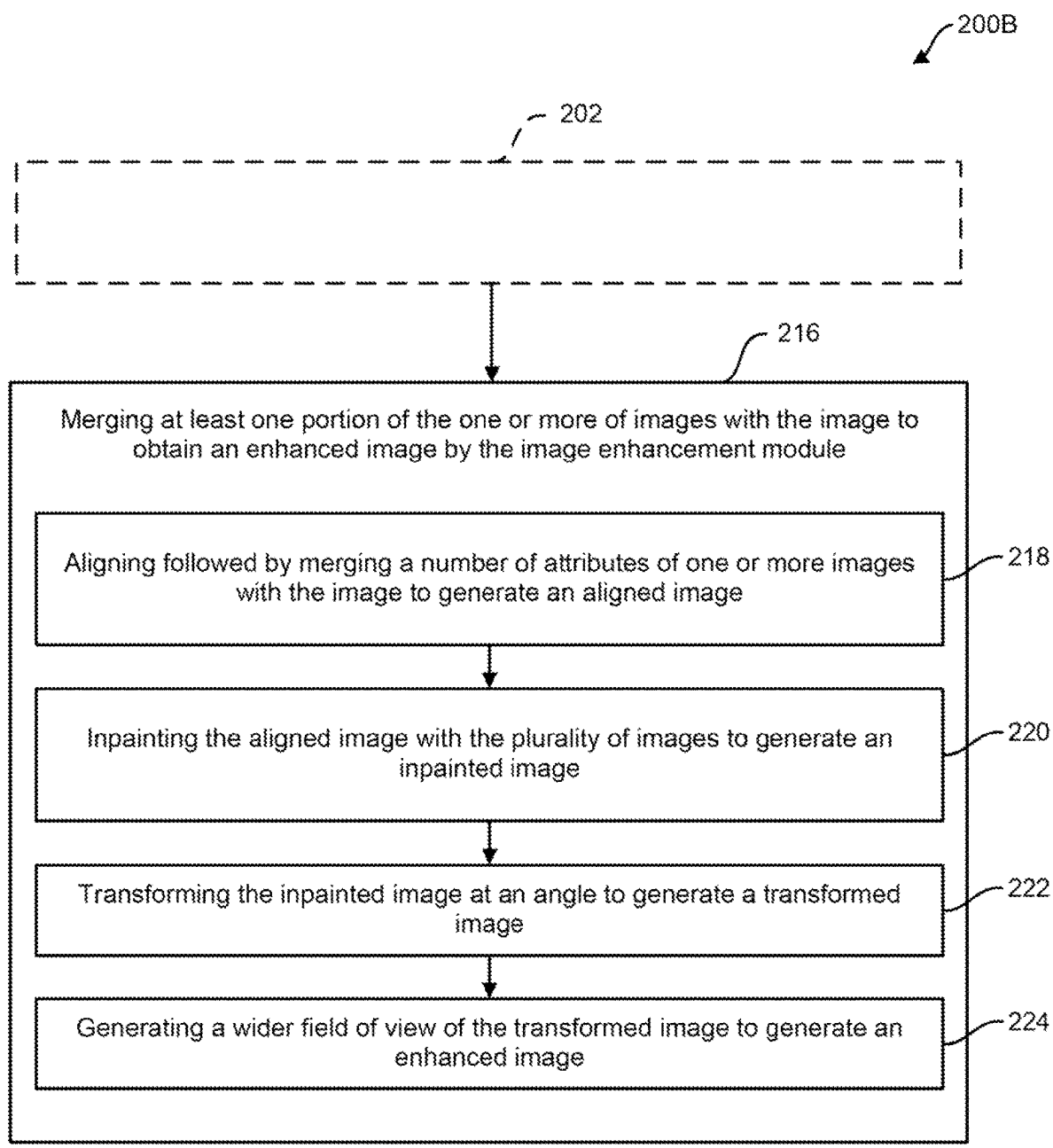
FIG. 6 illustrates a method for generating a processed image in accordance with present invention.

FIG. 6 illustrates a method for generating a processed image. The method includes firstly, receiving an image from an electronic device. The image along with some information related to the image captured by the hardware of the electronic device is sent to a cloud database and stored in the database in step. The database already stores several images that are obtained from a number of sources. Once the image is stored in the database, a number of features are extracted from the image by a feature extraction module. Feature extraction models such as place classification and object detection perform the feature extraction with the help of an extractor configured within the feature extraction module.

Next, the features extracted are compared with the features of the number images stored in the cloud database which is done by a comparator configured inside the feature extraction module. Based on the comparisons generated by the comparator, the recommender module recommends one or more images based on a similarity score. The recommended images are sent to the image enhancement module.

The image enhancement module includes several components for enhancing the quality of the image by merging at least one portion of the one or more of images with the image as depicted by step 216 which further includes a number of steps as listed below.

The detail enhancement unit of the image enhancement module aligns and merges details from one or more images with the captured image and generates an aligned image in step 218. The details include high frequency and light intensity. Next, the inpainting unit of the image enhancement module removes one or more unwanted objects from the aligned image and fills in the gaps created by utilizing the recommended images to generate an imprinted image 220.

Next, a suitable viewing angle of the imprinted image is found to generate a transformed image in step 222. Lastly, a panorama generating unit of the image enhancement module covers a wider field of view of the transformed image to generate the processed image in step 224.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for generating an enhanced image from an image, wherein the method comprising;
   receiving an image from an electronic device;
   storing the image on a cloud database;
   extracting one or more features from the image;
   comparing the image with a plurality of images stored in the cloud database based on the one or more features;
   recommending one or more images from the plurality of images based on a similarity score with the image;
   receiving the one or more images based on recommendation;
   aligning followed by merging a number of attributes of one or more images with the image to generate an aligned image, wherein the number of attributes are based on high frequency;
   inpainting the aligned image with the plurality of images to generate an imprinted image;
   transforming the imprinted image at an angle to generate a transformed image; and
   generating a wider field of view of the transformed image to generate an enhanced image.

2. A computer program product comprising a non-transitory computer useable medium having computer program logic for enabling at least one processor in a computer system for generating a processed image via a software platform, said computer program logic comprising:
   receiving an image from an electronic device;
   storing the image on a cloud database;
   extracting one or more features from the image wherein the one or more features comprise geographical location, latitude, longitude, altitude, objects of interest, condition in which the photo is taken, light, weather, date and time, temperature, haze, humidity;
   comparing the image with a plurality of images stored in the cloud database based on the one or more features;
   recommending one or more images from the plurality of images based on a similarity score with the image;
   receiving the one or more images based on recommendation;
   aligning followed by merging a number of attributes of one or more images with the image to generate an aligned image, wherein the number of attributes are based on high;
   inpainting the aligned image with the plurality of images to generate an imprinted image;
   transforming the imprinted image at an angle to generate a transformed image; and
   generating a wider field of view of the transformed image to generate an enhanced image.

3. The image enhancement method in accordance with claim 1, wherein the electronic device is either of a smartphone, a laptop, a digital camera or a tablet.

4. The image enhancement method in accordance with claim 1, wherein the one or more features of the image are obtained from one or more sensors of the electronic device.

5. The image enhancement method in accordance with claim 4, wherein the one or more sensors include at least one of a GPS sensor, an environmental sensor, a light sensor, a compass sensor and a barometer sensor.

6. The image enhancement method in accordance with claim 1, further comprising grouping the plurality of images to one or more group of images based on GPS location of the image.

7. The image enhancement method in accordance with claim 6, further comprising creating a 3D virtual space of the one or more group of images.

8. The image enhancement method in accordance with claim 1, wherein the similarity score is based on weights assigned to the one or more features.

9. The image enhancement method in accordance with claim 1, further comprising processing the image by de-blurring and de-noising techniques to generate the enhanced image.

10. The image enhancement method in accordance with claim 2, wherein the electronic device is either of a smartphone, a laptop, a digital camera or a tablet.

11. The image enhancement method in accordance with claim 2, wherein the one or more features of the image are obtained from one or more sensors of the electronic device.

12. The image enhancement method in accordance with claim 11, wherein the one or more sensors include at least one of a GPS sensor, an environmental sensor, a light sensor, a compass sensor and a barometer sensor.

13. The image enhancement method in accordance with claim 2, further comprising grouping the plurality of images to one or more group of images based on GPS location of the image.

14. The image enhancement method in accordance with claim 13, further comprising creating a 3D virtual space of the one or more group of images.

15. The image enhancement method in accordance with claim 2, wherein the similarity score is based on weights assigned to the one or more features.

16. The image enhancement method in accordance with claim 2, further comprising processing the image by de-blurring and de-noising techniques to generate the enhanced image.

* * * * *